Dec. 18, 1923.
J. GALAMB
DRIP MOLDING AND TRIM RAIL
Filed March 3, 1922
1,477,752
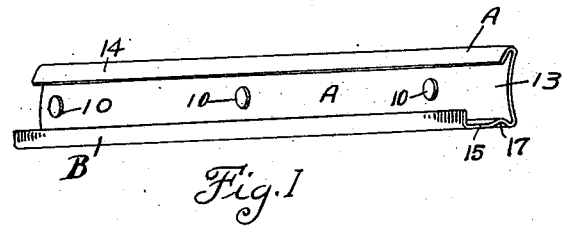
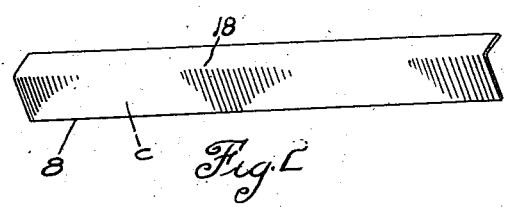
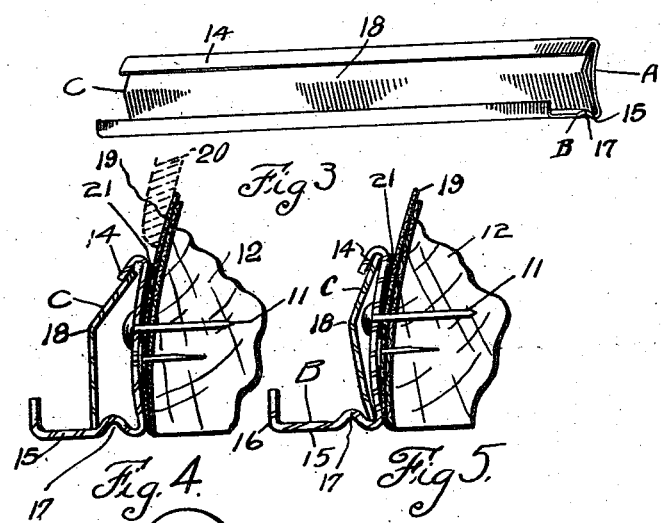
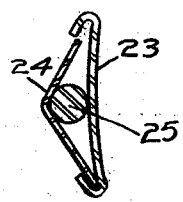
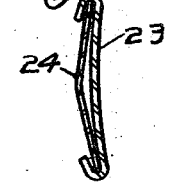
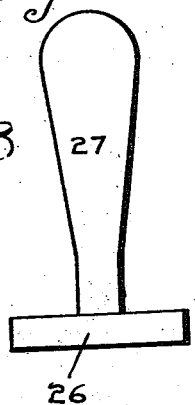
WITNESS:
John M. Cahill
INVENTOR.
Joseph Galamb
BY
ATTORNEY.

Patented Dec. 18, 1923.

1,477,752

UNITED STATES PATENT OFFICE.

JOSEPH GALAMB, OF DETROIT, MICHIGAN, ASSIGNOR TO FORD MOTOR COMPANY, OF DETROIT, MICHIGAN, A CORPORATION OF DELAWARE.

DRIP MOLDING AND TRIM RAIL.

Application filed March 3, 1922. Serial No. 540,913.

*To all whom it may concern:*

Be it known that I, JOSEPH GALAMB, a citizen of the United States, residing in the city of Detroit, county of Wayne, and State of Michigan, have invented new and useful Improvements in a Drip Molding and Trim Rail, of which the following is a specification.

The object of my invention is to provide new and useful improvements in a drip molding and trim rail, of simple, durable, and inexpensive construction.

A further object of my invention is to provide a combined drip molding and trim rail for the edges of roofs, and more particularly for the edges of the roofs of closed vehicle bodies.

A further object of my invention is to provide a drip molding and trim rail composed of metal and adapted to conceal the fastening means for said drip molding and trim rail.

A further object of my invention is to provide a drip molding and trim rail having a vertical flange adapted to be tacked or otherwise secured to the edge of a roof and having a laterally extending trough associated with the vertical portion adapted to carry away water or other fluid running off the roof and, in combination with such a drip molding and trim rail, a combined retaining and concealing device adapted to hold said fastening means from accidental displacement, and to conceal the fastening means.

With these and other objects in view, my invention consists in the arrangement, combination, and construction of the various parts of my improved device, as described in the specification, claimed in my claims, and shown in the accompanying drawings, in which:

Figure 1 illustrates a perspective view of my improved drip molding and trim rail.

Figure 2 shows a perspective view of a strip of the combined retaining and concealing strip.

Figure 3 shows a drip molding and trim rail and strip combined together to illustrate their assembled position.

Figure 4 shows a vertical, transverse, sectional view thru the drip molding and trim rail and a portion of a roof, the parts being in juxtaposition.

Figure 5 shows a view similar to Figure 4, but illustrating the final step in the process of attaching the improved drip molding and trim rail to the roof member.

Figure 6 shows a sectional view of a device embodying my invention and used for a trim rail only, as distinguished from being a combined trim rail and drip molding.

Figure 7 shows a similar view illustrating the assembled trim rail as distinguished from the view in Figure 6 where the trim rail is ready for assembly.

Figure 8 illustrates a form of tool for use in the assembly of the combined trim rail and drip molding, and Figure 9 shows a bottom view of the device illustrated in Figure 8.

Referring to the accompanying drawings, I have used the reference letter 'A' to indicate, generally, a strip of metal shaped to form my improved drip molding and trim rail, this metal being preferably of a rust proof character, or having a rust proof surface. At intervals, openings 10 are made thru this strip so that nails, screws, or the like, 11, may be driven thru the strip to fasten it to the roof member 12. This drip molding and trim rail has a vertical web or wall 13, having these nailing openings 10 therein, and has a turned-over flange 14 at the upper end of this vertical or attaching wall 13. The strip is also extended laterally from the attaching wall 13 to form a trough designated, generally, by the reference letter 'B'. This trough is formed by the horizontal portion 15, a turned-up flange 16, and the vertical wall 13. It will readily be seen that when rain or other liquid runs off a roof then that it will run down from the flange 14 into the trough 'B' and run out of the ends of the trough 'B'. The horizontal portion 15 has a bead 17 therein designed to form a trough or channel at the inner edge of the trough B.

A combined retaining and concealing strip 'C' of somewhat pliable metal and of substantially the width of the attaching flange 13 is formed by making a central, longitudinal, bend 18 therein. This concealing and retaining strip 'C' is brought to position illustrated in Figure 4 after the strip 'A' has been nailed or otherwise secured in place with its edges against the surfaces of the attaching portion 13 and the bow or bend therein directed away from the face of the attaching portion 13. The lower edge of the strip 'C' will rest in the trough 'B', and the upper edge will rest in a position adjacent to the bottom of the channel formed by the turned-over flange 14. The retaining and concealing strip 'C' is then fastened in place by merely pressing its lower edge over the bead 17 and into the channel formed by the bead 17 and the channel formed by the turned-over flange 14, as is illustrated in Figure 5.

When in this position it will readily be seen that rain running off the roof, of which the member 12 is a part, will run over the flange 14 down into the trough 'B' where it may run off at either end of the trough. In this connection it may be mentioned that heretofore drip moldings and trim rails of the general type here illustrated, have been made for similar purposes but these drip moldings and trim rails had to be made out of relatively heavy material and then the openings 11 countersunk therein so that screws could be countersunk in these openings and the openings filled in with putty or similar filler in order to give the drip molding and trim rail a smooth appearance and finish. Otherwise, the heads of the attaching means would appear and materially detract from the appearance of the finished job.

By the use of my improved drip molding and trim rail, however, it may be seen that the attaching devices are wholly concealed from view and they are further protected so that moisture may not seep in past the openings therefor to the wood 12, by the retaining and concealing strip 'C'. Furthermore, this strip prevents accidental displacement of the fastening devices 11 thereby insuring a long-lived and neat-appearing job for a drip molding and trim rail.

A further advantage results from the use of my improved trim rail and drip molding in that lighter material may be used as it is not necessary with this drip molding and trim rail to use material heavy enough so that the attaching means may be countersunk and hidden behind filling materials, such as putty.

In connection with the use of my improved device, I may extend the cloth covering 19, ordinarily provided with vehicle roofs, down between the roof member 12 and the drip molding, and trim rail 'A', thereby causing the rail 'A' to perform the function of a trim rail for the edges of the cloth covering in addition to its function as a drip molding rail. In this connection, it should be mentioned that with the drip moldings ordinarily provided for jobs of this type there is also a trim rail provided, as is indicated by the dotted lines 20, to cover the edges of cloth which I am enabled to eliminate. Under any circumstances, a layer of moisture-proof or impervious material 21 is disposed between the drip molding 'A' and the roof member 12. In the example here shown, I have coated the cloth 19 with a very heavy coat of thick white lead 21, before tacking the drip molding 'A' to the member 12, thereby making a watertight connection between the upper edge of the member 12, or the cloth covering it, and the upper edge of the drip molding 'A', thereby eliminating the danger that moisture might seep down between these two parts. This white lead may, of course, be dispensed with under certain circumstances, as where the nails for fastening the molding to the roof member compresses the cloth 19 sufficiently to form a liquid tight joint between such material and the molding, as usually happens in connection with artificial leather where the latter is used for a roofing covering.

In connection with the combined trim rail and drip molding, it will be seen that the same principle may be used to form a trim rail such as is illustrated in Figures Nos. 6 and 7. In this form of the device, channels are formed at either edge of the main strip 23 and then the retaining and concealing strip 24 is put in place by first putting one edge of such strip into one of the channels as is illustrated in Figure 6. A rod 25 is run in between the strip 24 and the strip 23 and then the strip is bent over the rod so that its remaining edge may be sprung under the remaining channel whereby the strip will be held in place by its natural resiliency. Other means may be used for springing this strip 24 into place so that when assembled it will appear as is illustrated in Figure 7.

In connection with the combined trim rail and drip molding, it will be understood that this may be installed by use of the tools shown in Figs. 8 and 9, where a wedge block 26 has a handle 27 secured thereto so that the strip 'C' may be placed as is illustrated in Figure 20, and then the small end of the wedge block 26 inserted in the channel 'B'; the block 26 is then run along the channel so that the wider end thereof may bend the strip 'C' slightly along the bend therein, and may force the lower edge thereof over the rib 17 so that the strip will be held into the channels at 14 and 17 by the resiliency of the strip. This forms a ready method of assembly and does not mar the enamel on the strip 'C' in case it has been enameled before assembly.

The advantage of this method of assembly of the strip 'C' will be readily apparent when it is considered that it is thereby possible to enamel both the strips 'A' and 'C' before they are placed on the body and then assemble them on a body without marring the enamel which saves the patience and expense required for painting or enameling the molding after it has been installed.

Among the other advantages arising from the use of my improved device, it may be mentioned that replacements are much easier in case it is desired to replace the drip molding and trim rail or to remove these to replace the cloth covering for the roof, as it is only necessary to stick a screw driver under one end of the strip 'C' to first pry up the end of the retaining and concealing strip and then the screw driver may be forced along to progressively loosen the strip 'C' from the drip molding and trim rail, which then makes the heads of the attaching means 11 readily accessible. Moreover, if the portion of the drip molding and trim rail adjacent to the attaching means be somewhat marred during the process of removing the attaching means, it will be seen that the final appearance of the repair job will not be materially marred as a new strip 'C', when properly painted, will entirely cover any traces of mars caused by attempts to remove the attaching means. Moreover, this device makes it feasible to use nails instead of screws, if desired and makes the heads of these nails more accessible for driving them home.

Some changes may be made in the arrangement and construction of the various parts of my improved device without departing from the spirit of the invention therein, and it is my intention to cover by my claims such changes as may be reasonably included within the scope thereof.

I claim as my invention:

1. A drip molding and trim rail comprising a strip forming a trough and attaching flange and having grooves at both edges of the attaching flange, and a combined concealing and retaining strip disposed contiguous to the attaching flange with its edges received in said grooves.

2. In a drip molding, a strip forming a trough and an attaching flange, said strip having grooves at opposite edges of the attaching flange, and a combined concealing and retaining strip initially having a central, longitudinal bend therein designed, when straightened, to force the edges of the strip into said grooves.

3. In a drip molding and trim rail for roofs, a strip of material having an attaching portion formed therefrom, said attaching portion having its upper edge turned over to form a channel and having its lower edge extended laterally and flanged to form a liquid receiving trough, said laterally extending portion having a bead therein designed to form a channel, and a combined concealing and retaining strip initially formed with an irregular cross-section whereby said strip may be placed against the retaining portion and straightened to force the edges of said strip into said channels.

4. In a drip molding and trim rail, a strip of material having a portion thereof forming an attaching flange, a channel formed from said material adjacent to each edge of said attaching flange, said strip having a laterally extending portion adjacent to the attaching portion designed to form a liquid-carrying trough, and a combined concealing and retaining strip initially formed with an irregular cross-section and designed to be straightened to force its edges into said channels.

5. In a drip molding and trim rail, a strip of material having a attaching portion formed with a channel adjacent to one edge and a liquid-receiving trough formed adjacent to the attaching portion, a combined concealing and retaining strip having initially an irregular cross-section and designed to be straightened to force an edge into said channel to hold said last described strip in assembled position.

Dated February 25, 1922.

JOSEPH GALAMB.